US008918364B1

(12) United States Patent
McCline et al.

(10) Patent No.: US 8,918,364 B1
(45) Date of Patent: *Dec. 23, 2014

(54) ONLINE MIRROR STATE TRANSITIONING IN DATABASES

(71) Applicant: Pivotal Software, Inc., Palo Alto, CA (US)

(72) Inventors: Matthew C. McCline, Foster City, CA (US); Milena Bergant, San Mateo, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/267,301

(22) Filed: May 1, 2014

Related U.S. Application Data

(63) Continuation of application No. 13/107,922, filed on May 15, 2011, now Pat. No. 8,751,443.

(51) Int. Cl.
*G06F 17/30* (2006.01)

(52) U.S. Cl.
CPC .................. *G06F 17/30581* (2013.01)
USPC .......................................... 707/610; 707/625

(58) Field of Classification Search
CPC .................. G06F 17/30578; G06F 11/1471
USPC ................................................. 707/610, 625
See application file for complete search history.

(56) References Cited

U.S. PATENT DOCUMENTS 6,199,074 B1 * 3/2001 Kern et al. ............................ 1/1

* cited by examiner

*Primary Examiner* — Rehana Perveen
*Assistant Examiner* — Alexander Khong
(74) *Attorney, Agent, or Firm* — Fish & Richardson P.C.

(57) ABSTRACT

In a mirrored database system, good quality of service and high availability is afforded by minimizing the time required for suspension of operations to transition between mirror states, and by keeping track of changes made to a primary database while the mirror database was out of communications so that a later mirror resynchronization process can quickly catch up the mirror database by making only the lost changes.

20 Claims, 5 Drawing Sheets

Re-Create Needed ? ⟶ 800

(Persistent-State = "Create Pending" ⟶ 810
OR
Persistent-State = "Created") ⟶ 820

AND (Mirror-State = "Mirror Down Before Create" ⟶ 830
OR
Mirror-State = "Mirror Down During Create") ⟶ 840

Re-Drop Needed ? ⟶ 850

(Persistent-State = "Drop Pending" ⟶ 860
OR
Persistent-State = "Aborting Create") ⟶ 870

AND

Mirror-State = "Only Mirror Drop Remains" ⟶ 880

US 8,918,364 B1

ONLINE MIRROR STATE TRANSITIONING IN DATABASES

BACKGROUND

This invention relates generally to mirrored databases used for online transaction processing (OLTP), and more particularly to managing on-line transitions between mirror states for the resynchronization of a mirrored database.

Enterprises employ database systems comprising mirrored databases as a repository of the enterprise's stored data, and to support operational systems such as online transaction processing (OLTP). The databases generally have large sizes, store large volumes of data in tables, and experience high numbers of online transactions.

Mirrored databases comprise a primary database and a mirror database pair that are synchronized by redundantly writing the same data to both databases for backup and to assure high availability of the data if one of the databases fails (crashes). In the event of a crash, or loss of communications with a database, the database transitions from a synchronized mirror state to a different mirror state where changes are tracked. Subsequently, it transitions to a state where a mirror resynchronization process must be performed to catch up lost changes and any new changes resulting from new online transactions while the mirror database was down in order to restore the databases to a synchronized state.

During such mirror state database transitions, suspensions of service occur which may be quite lengthy, particularly if long full directory scans are necessary to discover missing file-system objects (files and directories), of if mirror resynchronization is inefficient and lengthy. These adversely impact availability and quality-of-service. An important measure of database service availability is the time it takes for a mirror database to take over processing once a failure of the primary database has been detected. This time is referred to as the mean-time-to-repair (MTTR). Accordingly, it is important that lengthy mirror state transitions be avoided and that resynchronization be performed timely and efficiently so that the database has a very good repair-time and high-availability.

It is desirable to provide systems and methods that address these and other problems by avoiding lengthy mirror state transitions and affording timely resynchronization of mirrored databases while writing data directly to database files, and it is to these ends that the present invention is directed.

DESCRIPTION OF PREFERRED EMBODIMENTS

The invention is particularly well adapted for managing transitions between mirror states of mirrored database pairs comprising a primary database and a mirror database in a database cluster, and will be described in that context. As will be appreciated, however, this is illustrative of only one utility of the invention.

Figure 1:
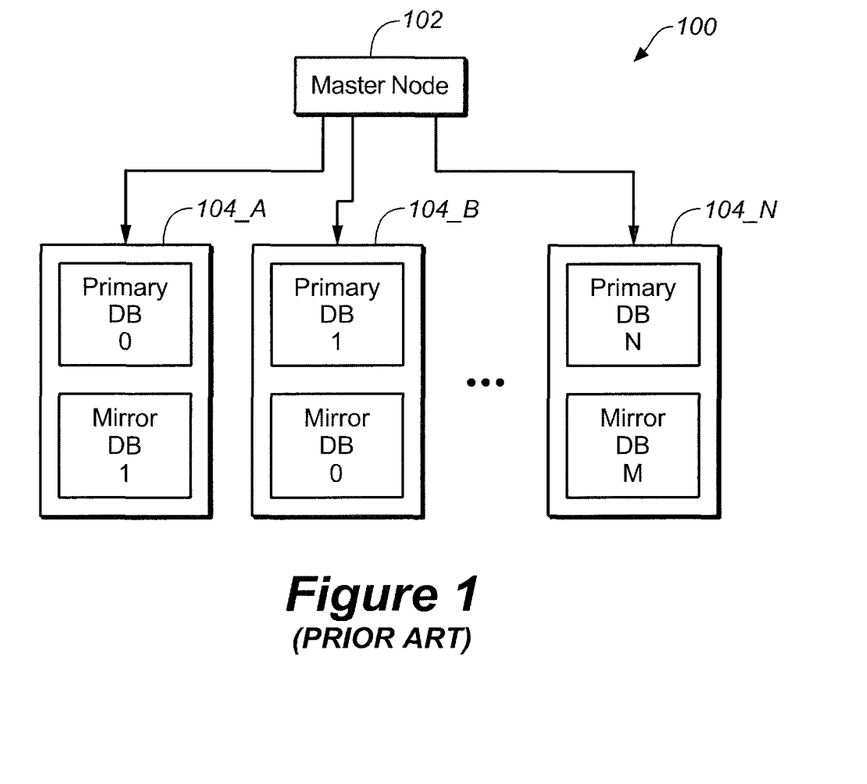
FIG. 1 is a block diagram that illustrates a known network architecture of a logical database cluster in which the invention may be employed.

FIG. 1 illustrates a shared-nothing network architecture of a logical database cluster 100 with which the invention may be employed. The network may include a master node 102 which internally connects to a plurality of shared-nothing nodes 104-A through 104-N. Each node may comprise a plurality of database (DB) segments (database instances) including one or more primary databases and one or more mirror databases. As indicated in the figure, for fault tolerance purposes, a primary database and its corresponding mirror database are located on different nodes. Node 104-A may contain, for example, Primary DB 0 and Mirror DB 1, whereas node 104-B may contain Primary DB 1and Mirror DB 0. Thus, mirroring Primary DB 0on node 104-A requires that primary data be written to Mirror DB 0 on node 104-B. Database systems such as illustrated in FIG. 1 may be used as a repository of an enterprise's digital stored data and to provide an architecture for data flow to support operational systems such as online transaction processing (OLTP).

Figure 2:
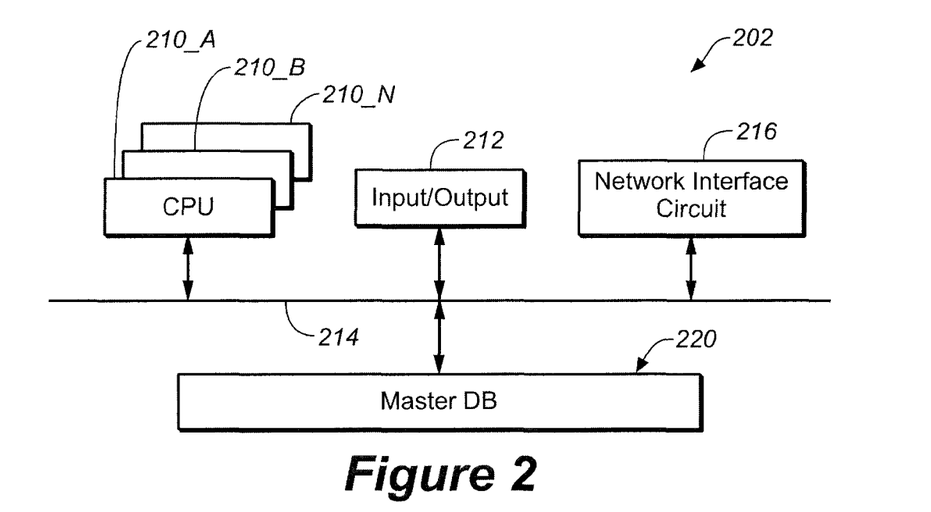
FIG. 2 is a block diagram of a master node of the network of FIG. 1 that may be configured to operate in accordance with an embodiment of the invention.

FIG. 2 illustrates a master node 202 configured to implement operations in accordance with the invention. The method node may comprise a plurality of host CPUs 210-A through 210-N connected to input/output (I/O) Devices 212 by a bus 214. The I/O devices may be primarily disk storage, and may also comprise standard computer system input and output devices. A network interface circuit 216 may also be connected to bus 214 to allow the master node to operate in a networked environment. The master node may also have a memory 220 connected to the bus that embodies executable instructions to control the operation of the host computer system of the node and to perform processes in accordance with the invention. Included in memory 220 is a master database instance to which users connect. A particularly important function of the database is to monitor the states of the primary and mirror database pairs in the cluster and in the event of a failure to determine which of the databases of a pair will assume the function of a primary database and which will become the mirror database.

Figure 3:
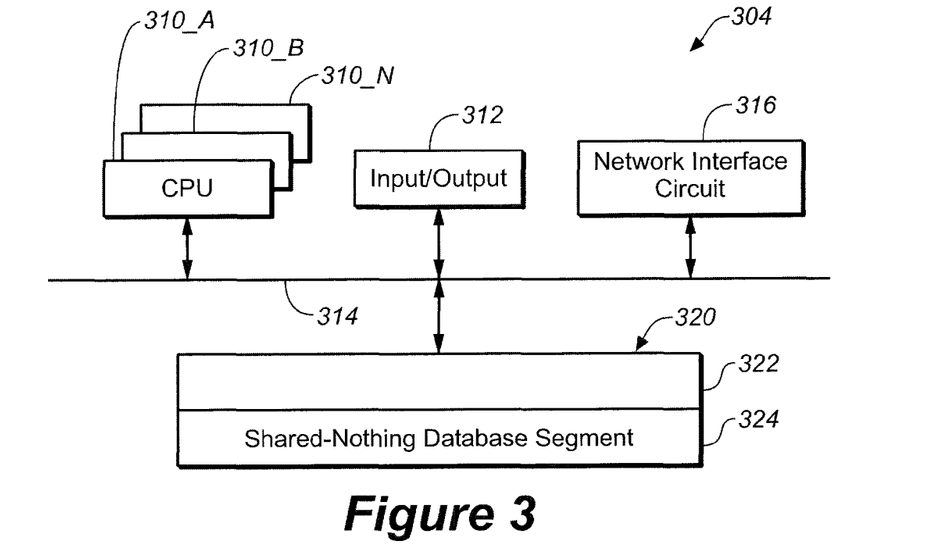
FIG. 3 is a block diagram of a node of the network of FIG. 1 that may be configured to operate in accordance with an embodiment of the invention.

FIG. 3 illustrates a shared-nothing node 304 configured to implement operations in accordance with the invention. Node 304 may have a similar architecture to master node 202, comprising a plurality of host CPUs 310-A through 310-N connected to a bus 314. A set of input/output devices 312, a network interface circuit 316 to afford network connectivity, and a memory 320 may also be connected to the bus. Memory 320 may comprise a first array portion 322 containing data and executable instructions to implement the processes of the invention, and may include one or more shared-nothing database segments 324. The database segments 324 may comprise primary and mirror DB instances.

The invention affords good quality of service and high-availability for current and new transaction-related changes when the mirror database is transitioning to down (or out of communications), when the mirror database is being resynchronized, and when the mirror database is transitioning to being up and synchronized. The invention temporarily carefully suspends current and new changes for a brief time to minimize the time of transitions of the mirror state to down (unsynchronized) and later to back up (synchronized) to provide the appearance of affording continual service and availability. As will be explained, work is routed through modules that can suspend change work, and track the create/re-drop change work necessary to make file-system objects quickly available again on the mirror so that online work can proceed in a mirrored state promptly after a brief suspension of service. Additionally, the invention provides efficient mirror database resynchronization that operates in parallel in the background handling lost changes while the mirror was down, while not blocking current and new transaction-related changes. In particular, all the database file system input/output (I/O) is routed through modules in the master and segment nodes that can temporarily suspend I/O work when there is a communication loss with the mirror so that the master database can choose which mirror will be declared to take over.

Figure 4:
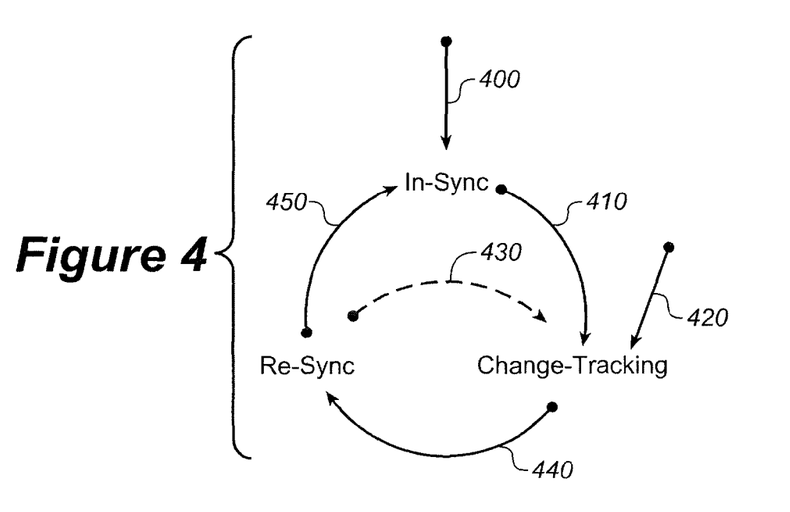
FIG. 4 illustrates mirror state transitions of a database in accordance with embodiments of the invention.

FIG. 4 illustrates the mirror state transitions of a mirrored database in accordance with embodiments of the invention. When the primary database and the mirror database of a database pair are synchronized, the mirror state is In-Sync. Upon starting the database cluster with a synchronized database pair, the database pair will enter the In-Sync state at 400, as shown. If the primary database loses communications with the mirror database, and the master database designates the primary database to take over, then there is a transition 410 to the mirror state Change-Tracking. Otherwise, if the master database designates the mirror database to take over, the mirror database will come up as the new primary database in the mirror state Change Tracking, as shown at 420.

The invention quickly transitions from the synchronized (In-Sync) mirror state to the mirror down or out of communication (Change-Tracking) state while allowing current and new online ongoing transactions to continue substantially uninterrupted and without loss of service. In the Change-Tracking mirror state, the primary database keeps track of the changes that are made while the mirror is out of communications so that later mirror resynchronization can quickly catch-up the mirror with only the lost changes being required. If the mirror database were physically lost so that a full resynchronization is necessary, then changes will not be recorded during Change-Tracking. Rather, a full resynchronization process would be performed when a new mirror database becomes available. Later, when re-synchronizing the mirror, the process quickly transitions from the Change-Tracking mirror state to the mirror-resynchronization state Re-Sync. This is accomplished by quickly re-creating on the mirrored database any file system objects that were created on the primary database while the mirror database was out of communication. New online transaction related changes can be mirrored immediately after the transition since all necessary file system objects (files and directories) will exist.

As shown in FIG. 4, when the system re-synchronizes the mirror database, the mirror state transitions at 440 to the Re-Sync mirror state. In this mirror state, if the primary database loses communications with the mirror database, the mirror state will transition back at 430 to the Change-Tracking state. Since the mirror database is not synchronized, it cannot take over as the primary database. After the mirror resynchronization process is complete, there is a transition 450 from mirror state Re-Sync to mirror state In-Sync, at which a mirrored database pair is again highly available for service. In accordance with one embodiment, the invention efficiently catches up the mirrored database with a mirror resynchronization process in which only lost changes are sent to the mirror database, thereby optimizing the resynchronization time and minimizing the suspension of database availability for current and new online work.

FIGS. 5-8 illustrate in more detail embodiments of the mirror state transition processes of FIG. 4 in accordance with the invention.

Figure 5:
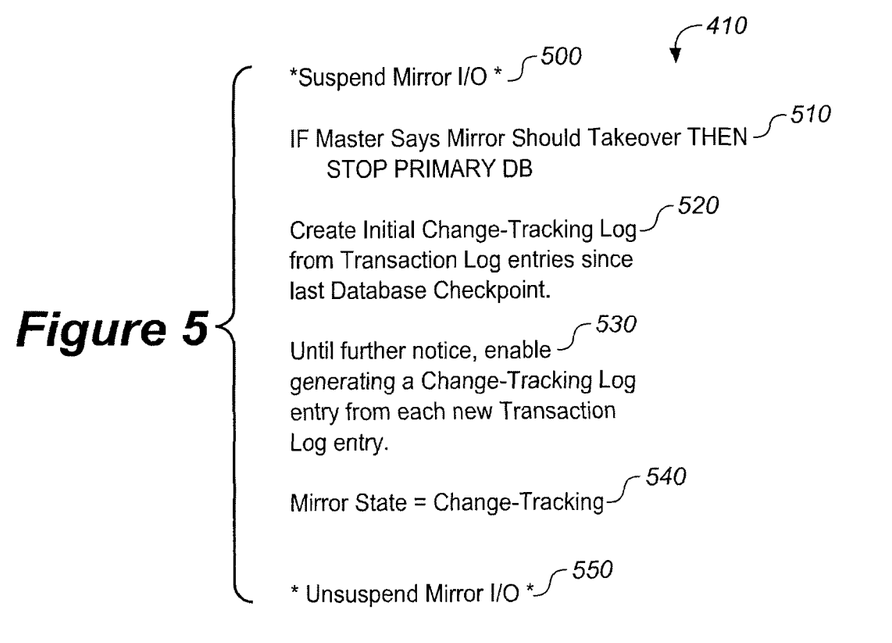
FIG. 5 illustrates a transition between In-Sync and Change-Tracking mirror states in accordance with an embodiment of the invention.

FIG. 5 illustrates an embodiment of the In-Sync to a Change-Tracking mirror state transition process 410 of FIG. 4 in accordance with the invention. As shown, upon a loss of communication between the primary database and the mirror database, the mirror database input/output (I/O) is suspended at 500. At 510, the master database determines which database mirror will take over. If the master database chooses the mirror database to take over, then the primary database is stopped immediately. Otherwise, suspension of I/O from the mirror database is continued and the primary database enables tracking of new changes. Any change since the last database checkpoint may or may not have been written by the database background writer to the mirror database. Accordingly, Change-Tracking entries are made in a Change-Tracking Log created at 520 in the database from entries entered into a transaction log (WAL) since the last database checkpoint. Significantly, since database checkpoints are taken frequently, the time required to read the transaction log and generate the Change-Tracking Log entries entered since a checkpoint is relatively fast so that suspension of service is very brief. At 530, tracking of Change-Tracking log entries from each new transaction log entry is enabled for tracking lost changes in the mirror database that later will need to be resynchronized. At 540 the transition to the mirror state Change-Tracking is completed, and at 550 the mirror database I/O is unsuspended, which allows new changes to be made.

Figure 6:
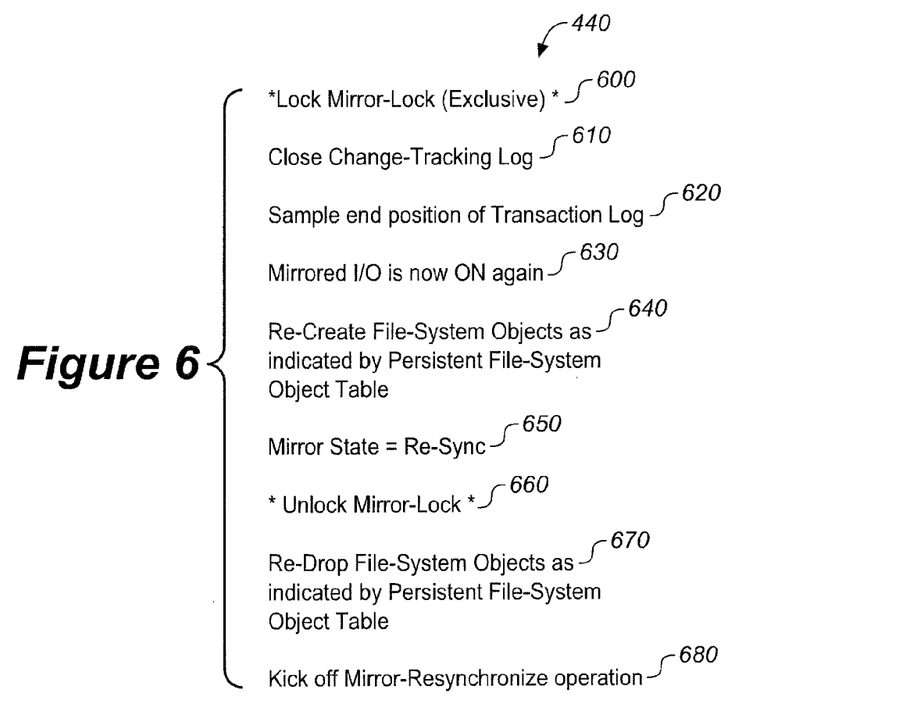
FIG. 6 illustrates a transition between Change-Tracking and Re-Sync mirror states in accordance with an embodiment of the invention.

FIG. 6 illustrates an embodiment of a Change Tracking to Re-Sync mirror state transition process 440 of FIG. 4 in accordance with the invention. At 608 an exclusive mirror lock is made to block new entries to the transaction log, and the Change-Tracking log is closed at 610. The end position of the transaction log may be sampled at 620 to block new tables from being created. At 630, the mirror database I/O is again enabled so database writes can be sent to the mirror database.

The database may include a table into which persistent entries are made identifying file system objects and indicating their states. Preferably, the persistent file system object table is of the type disclosed in applicants' co-pending application entitled Persistent File System Objects For Management of Databases (U.S. patent application Ser. No. 13/107,898, filed on May 14, 2011), the disclosure of which is incorporated by reference herein. As described in that application, the persistent file system object table maintains persistent records of file system objects that were created and/or changed to facilitate mirror resynchronization. Using the information in the persistent file system object table, the transition process at 640 quickly and easily finds any database file system object that the mirror database may be the missing and re-creates the object. Since the persistent table provides this information readily, a potentially long directory scan of all directories and files on both the primary and mirror databases to identify such objects is avoided, substantially reducing the time required for the transition to the Re-Sync mirror state at 650 and the unavailability of the database.

At 660, the mirror lock may be released. Since dropping file system objects affects only disk space, releasing the mirror lock reduces the service suspension time before re-dropping file system objects at 670 based upon entries in the persistent file system object table. At 680 the mirror resynchronization process may be started since all database file system objects will now exist on both the primary database and the mirror database.

Figure 7:
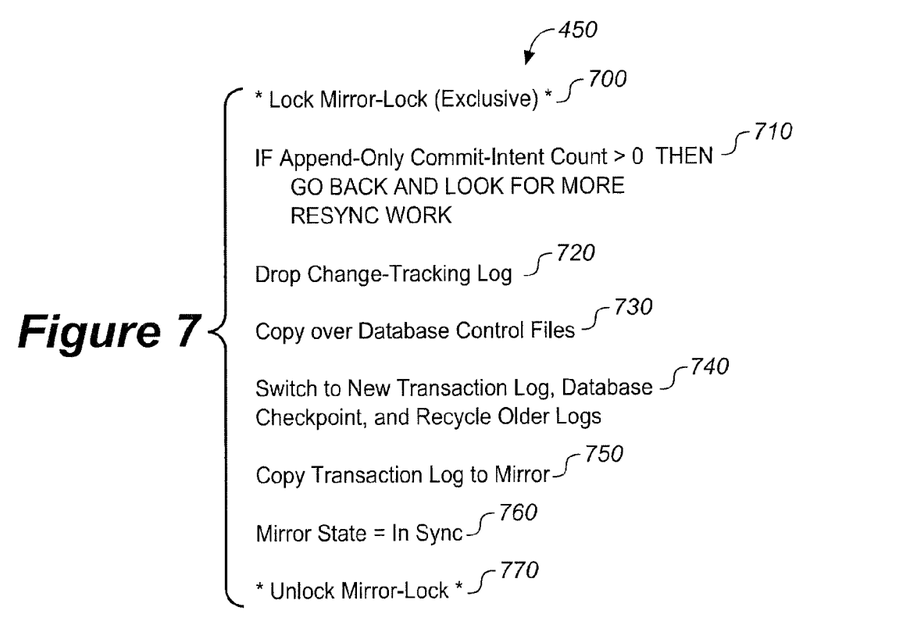
FIG. 7 illustrates a transition between Re-Sync and In-Sync mirror states in accordance with an embodiment of the invention.

FIG. 7 illustrates an embodiment of a Re-Sync to In-Sync mirror state transition process 450 of FIG. 4 in accordance with the invention. Preferably, the database system includes a shared-memory commit-intent counter to prevent the Re-Sync to In-Sync transition when there are new append-only data being committed. This shared-memory commit-intent counter is active during the commit preparation phase of a transaction involving append-only tables. Upon performing catch-up during the commit transaction process, under a mirror lock the shared memory counter is incremented. When the count is non-zero, it delays mirror resynchronization from transitioning from the Re-Sync to the In-Sync mirror states to permit the mirror resynchronization process to complete. Each time a persistent file system object table entry is updated with a new EOF, the intent count decrements. When the counter reaches zero, indicating no additional changes, the process may transition to the In-Sync mirror state.

As shown in FIG. 7, at 700 an exclusive mirror lock is imposed, and at 710 the append-only commit-intent counter is checked. If the count is greater than zero, the process looks for additional resynchronization changes to be completed. At this point, since lost changes have been resynchronized, the change-tracking log is no longer required and may be dropped at 720. At 730, database control files may be copied to the mirror database in order to avoid the necessity of copying much of the unneeded transaction log. The log may be manually switched to a new file and a new database checkpoint taken at 740. Prior transaction logs before this new file are not needed because only entries after the database checkpoint will be required for catch-up. Therefore, older log entries may be recycled which reduces the amount of transaction log that needs to be copied to the master database. Taking a database checkpoint also flushes resynchronization changes made to a shared memory database page cache to the mirror database at 750. At 760, the mirror state transitions to the In-Sync mirror state, and at 770 the mirror lock is released allowing normal changes to proceed. Advantageously, since the amount of time that database availability is suspended is bounded by the time between periodic database checkpoints, which is very short, this enables the invention to a limit the service suspension and unavailability to a very brief period of time.

Figure 8:
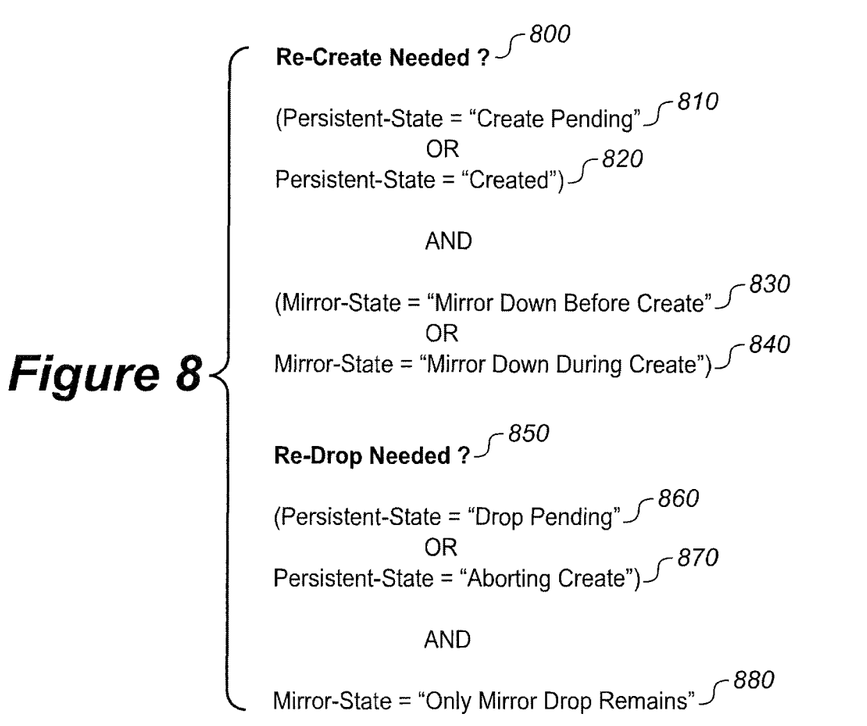
FIG. 8 illustrates for mirror Re-Create and Re-Drop processes using persistent objects states in accordance with embodiments of the invention.

FIG. 8 illustrates mirror re-create and re-drop processes and corresponding persistent objects states in accordance with embodiments of the invention. A mirror re-create of a database file system object is required during the mirror state transition from Change-Tracking to Re-Sync if the state of the database object as indicated by the persistent file system table is "Create Pending" (810) or "Created" (820) or being created, and the mirror state indicates that the object could not be created because the mirror was down or communication was lost before (830) or during (840) the create operation. A mirror re-drop of a database file system object during the same transition is needed if the state of a database object is either "Drop Pending" (860) if a drop transaction committed or "Aborting Create" (870) if a create transaction aborted, and the removal of the physical database file system object could not be performed because the mirror was down as indicated at 880 by the state "Only Mirror Drop Remains" in the persistent object table. The object state is recorded in the persistent file system object table enables very quick determination of whether a file system object need to be re-created or re-dropped without having to scan large database file directories or files. This also contributes significantly to very low down time and high-availability of the mirror databases.

As may be appreciated from the foregoing, the invention optimizes quality of service and high availability in databases by optimizing mirror state transitions by making them very quick, and by an efficient mirror resynchronization process that works in parallel in the background to make only lost changes while the mirror was down without blocking ongoing current and new transaction related changes.

An embodiment of the invention affords a computer storage product comprising a computer readable storage medium storing executable computer instructions for controlling the operations of computer systems to perform the processing operations described herein. The computer readable medium may be any standard media well known and available to those skilled in the art, including, but not limited to magnetic media such as hard disks, floppy disks, magnetic tape; optical media such as CD-ROMs, DVDs, holographic devices; magneto-optical media; and hardware devices configured to store and execute program code, such as application-specific integrated circuits (ASICs), programmable logic devices and ROM and RAM devices.

While the foregoing description has been with reference to particular embodiments of the invention, it will be appreciated by those skilled in the art that modifications to these embodiments may be made without departing from the principles and spirit the invention, the scope of which is defined by the appended claims.

The invention claimed is:

1. A method of transitioning between mirror states in a mirrored pair of databases comprising an original primary database and an original mirror database, the method comprising:

identifying a communications loss between the mirrored original primary and original mirror databases;

in response to identifying the communications loss, choosing by a master server which of the databases of the mirrored pair will be a new primary database, and identifying the other of the mirrored pair as a new mirror database, wherein the master server can choose either the original primary database or the original mirror database to be the new primary database;

transitioning to a change-tracking mirror state in which transactions continue to create changes to data in the new primary database;

tracking, during the change-tracking mirror state, the changes to the data and copying the changes to the data from a transaction log to a change-tracking log;

determining that the communications loss between the mirrored new primary and new mirror databases has ended;

in response to determining that the communications loss between the mirrored new primary and new mirror databases has ended, transitioning to a re-sync mirror state in which new mirrored database input and output are enabled and in which changes recorded by the change-tracking log are copied to the new mirror database;

determining that a commit-intent counter has a value greater than zero;

preventing a transition from the re-sync mirror state to an in-sync mirror state while the commit-intent counter has a value greater than zero;

decrementing the commit-intent counter each time a persistent file system object table entry has been updated with a new end of file until the commit-intent counter has a value of zero; and transitioning to the in-sync mirror state in response to determining that the commit-intent counter has a value of zero.

2. The method of claim 1, wherein tracking the changes to the data comprises identifying data changes recorded in the transaction log that occurred since a last database checkpoint and recording the identified data changes in the change-tracking log.

3. The method of claim 2, further comprising, in response to identifying the communications loss, temporarily suspending input/output (I/O) of the original mirror database.

4. The method of claim 3, wherein temporarily suspending I/O of the original mirror database comprises suspending the I/O for a time required for the identifying and recording of the data changes in the change-tracking log.

5. The method of claim 1, wherein during the re-sync mirror state, only lost changes to data that have been recorded by the change-tracking log during the change-tracking mirror state and that are necessary for resynchronization are copied to the new mirror database.

6. The method of claim 5, further comprising transitioning from the re-sync mirror state to the in-sync mirror state in which said databases are synchronized following the copying of the lost changes to the new mirror database.

7. The method of claim 1, further comprising, in response to determining that the communications loss between the mirrored new primary and new mirror databases has ended, imposing a momentary exclusive lock on the new primary database prior to transitioning to the in-sync mirror state, wherein the momentary exclusive lock blocks changes to data on the new primary database.

8. The method of claim 1, wherein transitioning to the in-sync mirror state comprises deleting the change-tracking log, switching the transaction log to a new transaction log file, and taking a database checkpoint to flush resynchronization changes to the new mirror database.

9. The method of claim 8 further comprising copying, during the re-sync mirror state, the new transaction log file and database control files to the new mirror database.

10. The method of claim 1 further comprising using information about database file system objects recorded in a persistent file system object table for re-creating missing database file system objects.

11. The method of claim 10 further comprising deleting file system objects on the new mirror database that had been deleted from the new primary database prior to the re-sync mirror state.

12. A non-transitory computer readable storage medium comprising executable instructions for controlling operation of a computer to transition on-line between mirror states in a mirrored pair of databases comprising an original primary database and an original mirror database, comprising instructions for:

identifying a communications loss between the mirrored original primary and original mirror databases;

in response to identifying the communications loss, choosing by a master server which of the databases of the mirrored pair will be a new primary database, and identifying the other of the mirrored pair as a new mirror database, wherein the master server can choose either the original primary database or the original mirror database to be the new primary database;

transitioning to a change-tracking mirror state in which transactions continue to create changes to data in the new primary database;

tracking, during the change-tracking mirror state, the changes to the data and copying the changes to the data from a transaction log to a change-tracking log;

determining that the communications loss between the mirrored new primary and new mirror databases has ended;

in response to determining that the communications loss between the mirrored new primary and new mirror databases has ended, transitioning to a re-sync mirror state in which new mirrored database input and output are enabled and in which changes recorded by the change-tracking log are copied to the new mirror database;

determining that a commit-intent counter has a value greater than zero;

preventing a transition from the re-sync mirror state to an in-sync mirror state while the commit-intent counter has a value greater than zero;

decrementing the commit-intent counter each time a persistent file system object table entry has been updated with a new end of file until the commit-intent counter has a value of zero; and transitioning to the in-sync mirror state in response to determining that the commit-intent counter has a value of zero.

13. The non-transitory computer readable storage medium of claim 12, wherein the instructions for tracking data changes comprise instructions for identifying data changes recorded in the transaction log that occurred since a last database checkpoint and recording the identified data changes in the change-tracking log.

14. The non-transitory computer readable storage medium of claim 13, wherein the instructions further comprise temporarily suspending input/output (I/O) of the original mirror database, in response to identifying the communications loss.

15. The non-transitory computer readable storage medium of claim 14, wherein the instructions for temporarily suspending the I/O for a time required for the identifying and recording of the data changes in the change-tracking log.

16. The non-transitory computer readable storage medium of claim 13, wherein during the re-sync mirror state, only lost changes to data that have been recorded by the change-tracking log during the change-tracking mirror state and that are necessary for resynchronization are copied to the new mirror database.

17. The non-transitory computer readable storage medium of claim 16 further comprising instructions for transitioning from the re-sync mirror state to the in-sync mirror state in which said databases are synchronized following the copying of the lost changes to the new mirror database.

18. The non-transitory computer readable storage medium of claim 16 further comprising instructions for, in response to determining that the communications loss between the mirrored new primary and new mirror databases has ended, imposing a momentary exclusive lock on the new primary database prior to transitioning to the in-sync mirror state, wherein the momentary exclusive lock blocks changes to data on the new primary database.

19. The non-transitory computer readable storage medium of claim 17, wherein the instructions for transitioning to the in-sync mirror state comprise instructions for deleting the change-tracking log, switching the transaction log to a new transaction log file, and taking a database checkpoint to flush resynchronization changes to the new mirror database.

20. The non-transitory computer readable storage medium of claim 12 further comprising instructions for using information about database file system objects recorded in a persistent file system object table for re-creating missing database file system objects.

\* \* \* \* \*